Aug. 8, 1961

R. S. LEMON 2,995,690

D.C.-OPERATED CONSTANT SPEED MOTOR

Filed Sept. 22, 1958

INVENTOR.
RICHARD S. LEMON
BY *Fulwider Mattingly & Huntley*
Attorneys

United States Patent Office 2,995,690
Patented Aug. 8, 1961

2,995,690
D.C.-OPERATED CONSTANT SPEED MOTOR
Richard S. Lemon, Pasadena, Calif., assignor to Reed and Reese, Inc., Pasadena, Calif., a corporation of California
Filed Sept. 22, 1958, Ser. No. 762,442
6 Claims. (Cl. 318—138)

This invention relates to control circuits for motors, and more particularly to a unique system for operating a synchronous motor at constant speed from a D.-C. voltage source.

In many aircraft and missile applications, it is imperative that a motor operate at a constant speed. Such motors which are operated from a battery, may be either D.-C. or A.-C. motors. As to the type of motor to be used, it is generally recognized that the A.-C. motor is preferable. One reason for this preference is that the brushes of D.-C. motors, which must be resiliently held against the commutator, are subject to vibrations. Vibratory movement of the brushes causes the area of contact of the brushes against the commutator to vary, whereupon the motor output shaft is caused to rotate at varying speeds.

An A.-C. motor can be driven from a D.-C. source by means of converters (e.g., dynamotors and electro-mechanical "choppers"). However, the use of converters adds to the overall size and weight of the motor system, which is undesirable where space and weight are at a premium. Space and weight are also used by corrective means employed to combat voltage variations and the effects of temperature changes on the operation of the motor system.

It is an object of this invention to provide a unique means for driving an A.-C. motor from a D.-C. source, which eliminates converters of the type heretofore employed.

It is another object of this invention to provide a unique circuit for operating an A.-C. motor at a constant speed from a D.-C. source, and which is not affected by fluctuations in the voltage from the source.

A further object of this invention is to provide a control circuit for a synchronous motor, which develops evenly spaced pulses for supplying electromotive power to the synchronous motor from a D.-C. source.

It is yet a further object of this invention to provide a control circuit for a synchronous motor having a pair of control windings and feed-back windings connected in parallel, and which are supplied with voltages alternately to effect rotation of the rotor in the same direction.

It is yet another object of this invention to provide means for operating a synchronous motor at constant speed from a D.-C. source, utilizing oscillator and gating circuits for supplying voltages alternately to a pair of control windings for the motor, wherein pulses developed for controlling the speed of rotation of the rotor are maintained at a constant repetition rate despite fluctuations in the D.-C. voltage.

The above and other objects and advantages of this invention will become apparent from the following description, taken in conjunction with the accompanying drawings of an illustrative embodiment thereof, and in which.

Figure 1:
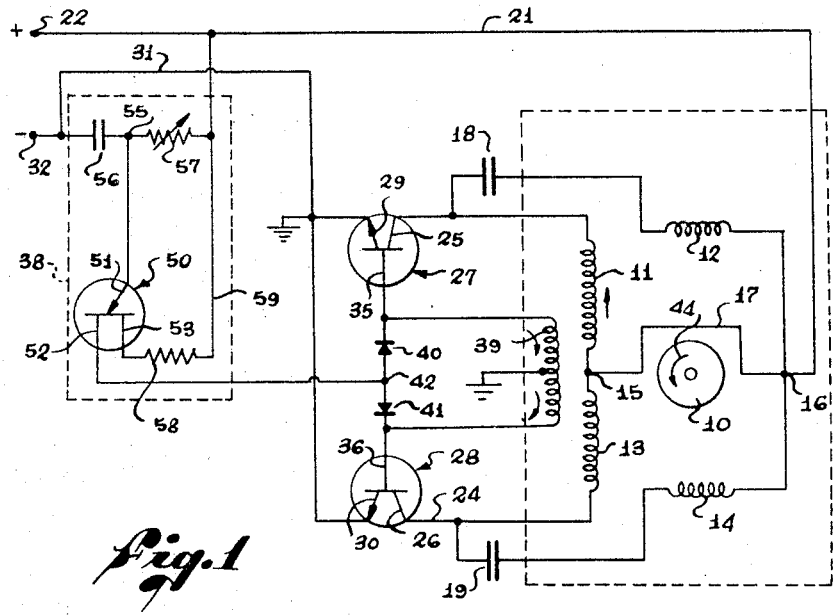
FIGURE 1 is a schematic diagram of my control circuit, showing a pair of transistors connected to respective control windings of a synchronous motor, wherein the transistors are rendered alternately conducting in response to equally spaced pulses developed by an oscillator.

Referring to FIGURE 1, there is shown a synchronous motor having a hysteresis type of rotor 10, and provided with two sets of control windings and auxiliary windings 11—12 and 13—14. These sets of windings are connected in parallel, and to this end the junction 15 of the control windings 11, 13 is connected to a junction 16 of the auxiliary windings 12, 14, as indicated at 17. A capacitor 18 is connected in series with the auxiliary winding 12, such winding 12 and capacitor 18 being connected across the control winding 11. Similarly, the capacitor 19 is connected in series with the auxiliary winding 14, so that such winding 14 and the capacitor 19 are connected across the control winding 13. The capacitors 18, 19 are provided to effect a 90° phase shift of voltages applied across the associated control windings 11, 13.

The junction 16 is connected, as at 21, to the positive terminal 22 of a D.-C. supply source. The control windings 11, 13 are connected, as at 23 and 24, to the collector electrodes 25, 26 of respective transistors 27, 28. The emitter electrodes 29, 30 of the transistors 27, 28 are both connected, as at 31, to the negative terminal 32 of the D.-C. source. The transistors 27, 28 are shown to be N-P-N junction transistors, which upon being rendered conducting will connect the associated control windings across the source.

The control windings 11, 13 are so poled that when the transistors are conducting, the direction of current flow through the control windings 11, 13 causes the rotor 10 to be rotated in the same direction.

The transistors 27, 28 are rendered alternately conducting in my invention. To effect such alternate conduction, the base electrodes 35, 36 of the transistors 27, 28 are connected in circuit with an oscillator 38 and a feedback winding 39. The feedback winding 39, which may be center-tapped to the ground as shown, is connected at its ends to the respective bases 35, 36. The bases 35, 36 are coupled to the oscillator through a pair of back-to-back diodes 40, 41 which are also located between the ends of the feedback winding 39.

The oscillator 38 supplies unipolar pulses to the junction 42 of the diodes 40, 41. When my circuit is initially turned on, i.e., when the D.-C. supply source is connected to the circuit, the first pulse finds one of the transistors 27, 28 to be more readily conductive than the other. This pulse renders the base of such transistor more positive than the emitter thereof. Since, for conduction of an N-P-N junction transistor, the base must be positive with respect to its emitter, such pulse causes this transistor to be rendered conducting. Current thus flows through the associated control winding and its auxiliary winding to effect rotation of the rotor 10 in a predetermined direction, e.g., counter-clockwise as indicated by the arrow 44.

Current flowing through the control winding causes a voltage to be induced in the feedback winding 39. This induced voltage is of a polarity to establish current flow in the feedback winding in a direction to enhance or aid conduction of the conducting transistor. In other words, the voltage induced in the feedback winding 39 is such as to make the base of the conducting transistor still more positive.

Meanwhile, the direction of current in the feedback winding is such that the base of the non-conducting transistor is brought to a negative potential. Accordingly, the stage is set so that the diode associated with the non-conducting transistor will pass the succeeding current pulse from the oscillator 38, thereby establishing a positive to negative base-emitter potential difference to render such transistor conducting. This results in inducing a voltage in, and establishing current flow through, the associated control winding and its auxiliary winding in a direction to keep the rotor 10 moving in the same (counter-clockwise) direction. Simultaneously, a voltage is induced in the feedback winding 39 which is of opposite polarity to that previously induced therein; according, the other transistor is rendered non-conducting.

The symmetrical arrangement of the windings and capacitors 11, 12, 18 and 13, 14, 19 insures that the loading of the transistors 27, 28 is balanced, i.e., the load on the transistor 27 is the same, when it is conducting, as the load on the transistor 28 when it is conducting. Also, by connecting the capacitors and windings 18, 12 and 19, 13 in the same manner between the collectors 25, 26 and the junction 16 as shown, I prevent quadrature current from flowing through the control windings 11, 13.

To effect operation of the rotor 10 at a constant speed, it is essential that the pulses from the oscillator 38 be evenly spaced. The speed of a synchronous motor will not be affected by amplitude variations of the pulses. Thus, if the pulses are maintained at a constant repetition rate, and they are evenly spaced, fluctuations of the D.-C. source will have no effect on the speed of rotation of the rotor 10.

To effect the desired pulse production, I utilize in my oscillator 38 a double-based diode device 50 of a well known design, having a single emitter 51 and a pair of base electrodes 52, 53. As is well known, this type of device is one in which one of the bases 53 is electrically closer to the junction of the diode. Current flow between the emitter 51 and the other base 52 will not take place unless the potential of the emitter 51 is above a predetermined level.

To arrange the double-based diode 50 to produce pulses in accordance with my invention, I couple the emitter 51 to the junction 55 of a capacitor 56 and resistor 57 which are connected between the negative and positive terminals 32, 22 of the supply source. A current-limiting resistor 58 is connected between the base 53 and the positive terminal 22, as at 59.

Referring to FIGURES 2–5 along with FIGURE 1, the charging and discharging of the capacitor 56 is controlled by the time constant of the capacitor 56 and the resistor 57, and by the potential of the base 53. For a given potential of the base 53, the voltage on the emitter 51 follows the charge build up on the capacitor 56 (see FIGURE 2). At a given emitter voltage, indicated at 60, current flows through the other base 52. The capacitor discharges through the base 52, as indicated at 61 in FIGURE 2. The emitter current of the diode 50 is a positive pulse 63 (see FIGURE 3) which falls substantially to zero upon discharge of the capacitor 56. The emitter voltage falls to a minimum value, indicated at 62 in FIGURE 2; from such level, the capacitor is again charged, so that the emitter voltage again rises to the level 60 to produce a succeeding pulse 63.

Figure 4:
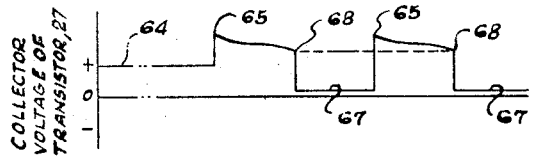
FIGURE 4 is a graph of the wave form of a collector voltage of one of the transistors, to show how the transistor is made conductive during the interval between two adjacent current pulses and non-conductive during the succeeding interval.
Figure 5:
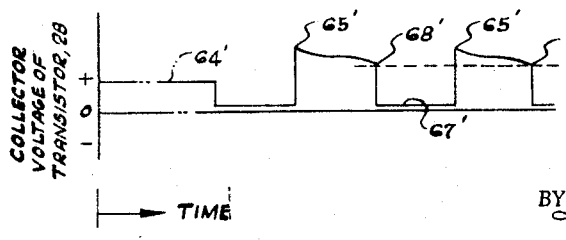
FIGURE 5 is a graph, similar to FIGURE 4, to aid in explaining the alternating conducting condition for the other transistor.

Initially, the potentials of the collectors 25, 26 of the transistors 27, 28 are substantially that of the positive terminal 22 of the D.-C. source, as indicated at 64 and 64′ in FIGURES 4 and 5. If the transistor 27 is the one which is more readily conductive upon the occurrence of the first current pulse 63, its base 35 is made more positive than the emitter 29, thereby to establish current flow through its emitter-collector path. This connects the control winding 11 to the D.-C. source so that a voltage is induced in the control winding 13 which adds to the initial potential at the collector 26 of transistor 28. Such voltage rises to a maximum, as indicated at 65 in FIGURE 4. The induced voltage decays, as shown, to potential level 68; then, with the occurrence of the next succeeding pulse 63 from the oscillator 38, which renders the transistor 27 non-conducting and the transistor 28 conducting, the potential on the collector 26 falls to a minimum value 67. When the next pulse 63 occurs, the potential of the collector 26 increases from the lowermost level 67 to the maximum of 65; thereafter, the collector voltage follows the pattern wherein it falls successively to the levels 68 and 67, from which it is increased to the maximum level 65.

The explanation for the raising of the collector voltage of the transistor 28 between the levels 64 and 65 is found in the fact that, at the start of the conducting period of the other transistor 27, the current through its control winding 11 causes a voltage to be induced in the control winding 13, to bring the potential of the collector 26 from its initial level 64 to the level 65.

The fall of the collector potential from the level 68 to the lowermost level 67 is explained by the fact that, at the start of the conducting period of the transistor 28, the collector to emitter resistance falls to a fraction of an ohm, so that during the period of conduction the collector 26 is virtually connected to the negative terminal 32.

The explanation for the operation of the transistor 27 is the same as that for the operation of the transistor 28. As shown in FIGURE 5, the potential of the collector 25 is initially at a level of 64′, drops to 67′ at the start of conduction on the occurrence of the first pulse 63, and rises to a maximum of 65′ on the occurrence of the next pulse 63. The collector voltage falls to the level 68′ from which, upon the occurrence of the next succeeding current pulse 63, it falls to a lowermost level 67′. Thereafter, and upon the occurrence of the next succeeding current pulse 63, the collector voltage again rises to the maximum 65′ the cycle thereafter is repeated as above described for the transistor 28.

Figure 2:
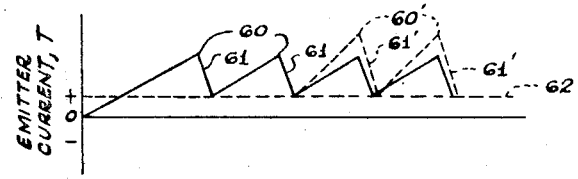
FIGURE 2 is a graph of the wave form of the emitter voltage of a double-based diode used in the oscillator portion of FIGURE 1, showing the rise and fall of such voltage in accordance with the charging and discharging of a capacitor in the oscillator circuit.
Figure 3:
FIGURE 3 is a graph of the wave form of spaced current pulses through the double-based diode, such pulses appearing as spikes coincident with the start of the discharge of the capacitor.

As previously explained, the spacing between the pulses 63 is not affected by fluctuations in the voltage across the terminals 22, 32. The reason for this is that the capacitor 56 and the base 53 of the diode 50 are connected to the positive terminal 22 (through the resistors 57 and 58). The potential of the emitter 51 must be positive by a fixed amount with respect to the base 53, in order to establish a current pulse. The base 53 floats electrically with variations in the D.-C. supply; thus, regardless of the voltage across the terminals 22, 32 the capacitor always charges to a value relative to the potential of the base 53, to cause the diode 50 to conduct. Furthermore, the points at which the charge on the capacitor is sufficient are always equally spaced. This is illustrated in FIGURE 2, which shows a dotted waveform for a higher voltage condition, wherein peaks 60′ are reached along steeper slopes but at the same times as the peaks 60 previously explained. The capacitor discharges more rapidly, as indicated at 61′. The current pulses will be of greater magnitude; however, as previously mentioned, this has no affect on the speed of rotation of the rotor 10.

While I have described my invention in connection with a particular embodiment, it will be apparent to those skilled in the art that various modifications can be made without departing from the spirit and scope of my invention. Accordingly, I do not intend that my invention be limited, except as by the appended claims.

I claim:

1. A control circuit for a synchronous motor comprising: control and auxiliary windings for the motor; capacitive means connected in series with one of the windings, said capacitive means and one winding being connected across the other winding, whereby voltages across the windings are out of phase, said motor operating in a predetermined direction upon voltages being applied to said windings; a pulse generator for producing equally spaced pulses; and a gating circuit connected between said generator and said windings, said gating circuit being responsive to each pulse to couple said windings to a D.-C. source to effect operation of the motor.

2. A system for controlling a synchronous motor from a D.-C. source comprising: two sets of control windings and auxiliary windings for the motor, the control winding and auxiliary winding of each set being connected in parallel with the other set, said connections including means for causing voltages developed across the windings of each set to be out of phase, said motor operating in a predetermined direction upon voltages appearing across the windings in either set; a pulse generator for producing equally spaced pulses; a gating circuit connected betwen said generator and said windings, said gating circuit being responsive to each pulse to couple said windings to a D.-C. source to effect operation of the motor; and a feedback winding inductively coupled to said control windings, said feedback winding being effective to establish operation of said gating circuit upon the occurrence of said pulses.

3. A control circuit for a synchronous motor comprising: two sets of windings for the motor, each set including a control winding and an auxiliary winding, said sets being connected in parallel, said auxiliary windings including respective capacitors in series therewith to cause voltages appearing across the parallel windings to be 90° out of phase for driving the motor; a respective transistor having its emitter-collector path connected in series with one of said winding sets across a D.-C. source; a pulse generator for producing equally spaced pulses; and means responsive to said pulses to render said transistors alternately conducting, whereby said sets are alternately connected to the source, said sets being disposed in the motor so as to drive the motor in the same direction.

4. A control circuit for a synchronous motor comprising: two sets of windings for the motor, each set including a control winding and an auxiliary winding, said sets being connected in parallel, said auxiliary windings including respective capacitors in series therewith to cause voltages appearing across the parallel windings to be 90° out of phase for driving the motor; a respective transistor having its emitter-collector path connected in series with one of said winding sets across a D.-C. source; a pulse generator for producing equally spaced pulses; and a pair of back-to-back unidirectionally conductive devices connected between the base circuits of said transistors.

5. A control circuit for a synchronous motor comprising: two sets of windings for the motor, each set including a control winding and an auxiliary winding, the windings in said sets being connected in parallel, said auxiliary windings including respective capacitors in series therewith to cause voltages appearing across the parallel windings to be 90° out of phase for driving the motor; a respective transistor having its emitter-collector path connected in series with one of said winding sets across a D.-C. source; a pulse generator for producing equally spaced pulses; a pair of back-to-back unidirectionally conductive devices connected between the base circuits of said transistors; and a feedback winding connected across said unidirectionally conductive devices, said feedback winding being inductively coupled to the control winding in each set.

6. A control circuit for a synchronous motor comprising: two sets of windings for the motor, each set including a control winding and an auxiliary winding, said sets being connected in parallel, said auxiliary windings including respective capacitors in series therewith to cause voltages appearing across the parallel windings to be 90° out of phase for driving the motor; a respective transistor having its emitter-collector path connected in series with one of said winding sets across a D.-C. source; a pulse generator for producing equally spaced pulses; a pair of back-to-back unidirectionally conductive devices connected between the base circuits of said transistors; and a feedback winding connected between the base and emitter of each transistor, said feedback winding being inductively coupled to the control winding in each set.

References Cited in the file of this patent
UNITED STATES PATENTS

| | | |
|---|---|---|
| 2,814,008 | Staniloff | Nov. 19, 1957 |
| 2,814,769 | Williams | Nov. 26, 1957 |
| 2,864,983 | Crafts et al. | Dec. 16, 1958 |